Sept. 24, 1968     C. A. PIERONEK ET AL     3,402,651
AUTOMATIC FILM PROGRAMMER
Filed June 28, 1965     2 Sheets-Sheet 1
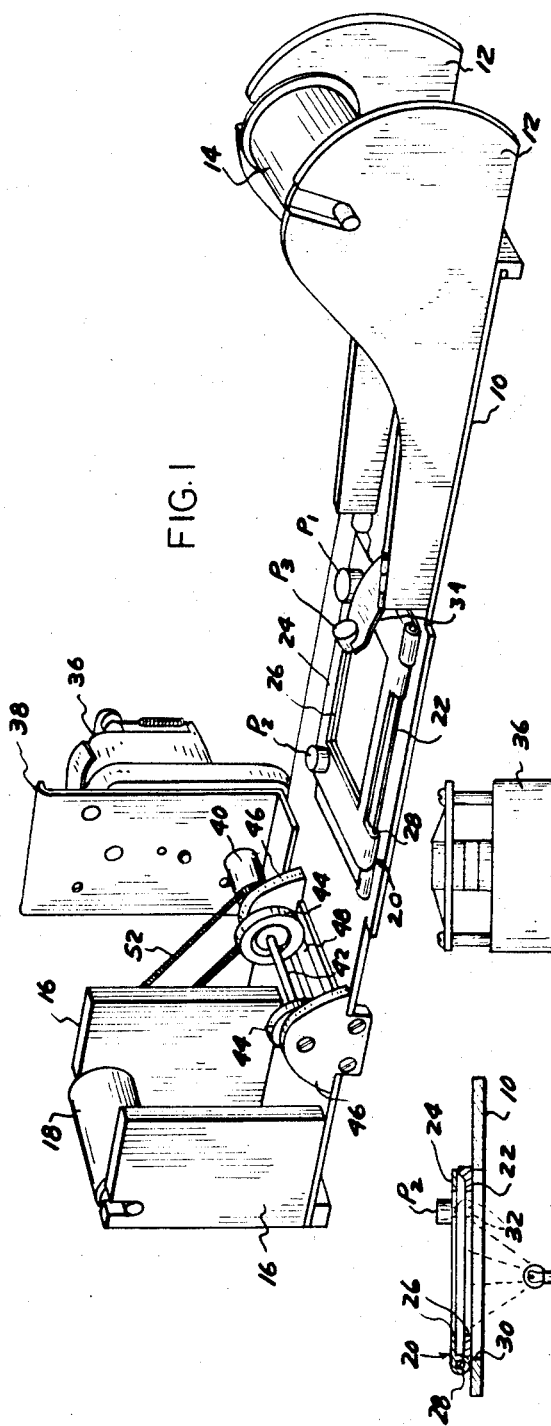
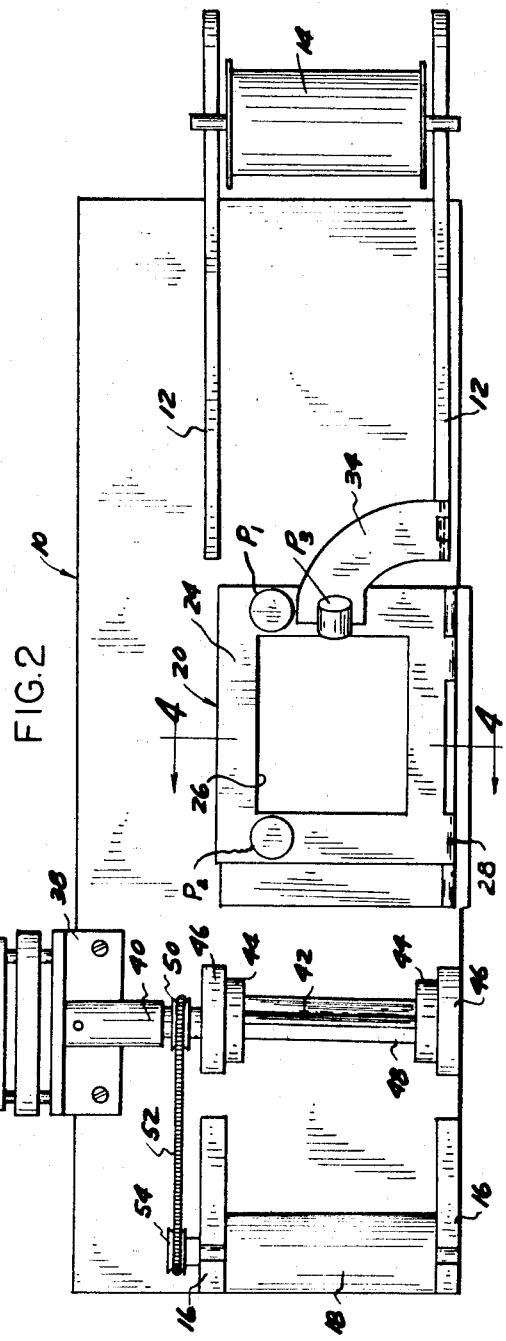
INVENTORS
CASS A. PIERONEK
JAMES H. LE BLOND
BY *Hanke & Hanke*
ATTORNEYS 3,402,651
AUTOMATIC FILM PROGRAMMER
Cass A. Pieronek, 884 N. Renaud, Grosse Pointe Woods, Mich. 48236, and James H. Le Blond, Hazel Park, Mich.; said Le Blond assignor to said Pieronek
Filed June 28, 1965, Ser. No. 467,446
13 Claims. (Cl. 95—75)

ABSTRACT OF THE DISCLOSURE

An automatic film programmer which includes support structure for feeding a strip of film through a platen having a frame opening in which the successive film frames are to be registered. Photoelectric cells and lights are arranged to sense film density and are integrated into automatic operating circuitry so that as film is moved through the platen the spaces between frames will be sensed to stop the feeding mechanism, operate an automatic printer or the like, and then restart the feed mechanism. Apparatus is provided to avoid actuation as a result of sensing film density contrasts other than that occurring between the frames.

---

Figure 3:
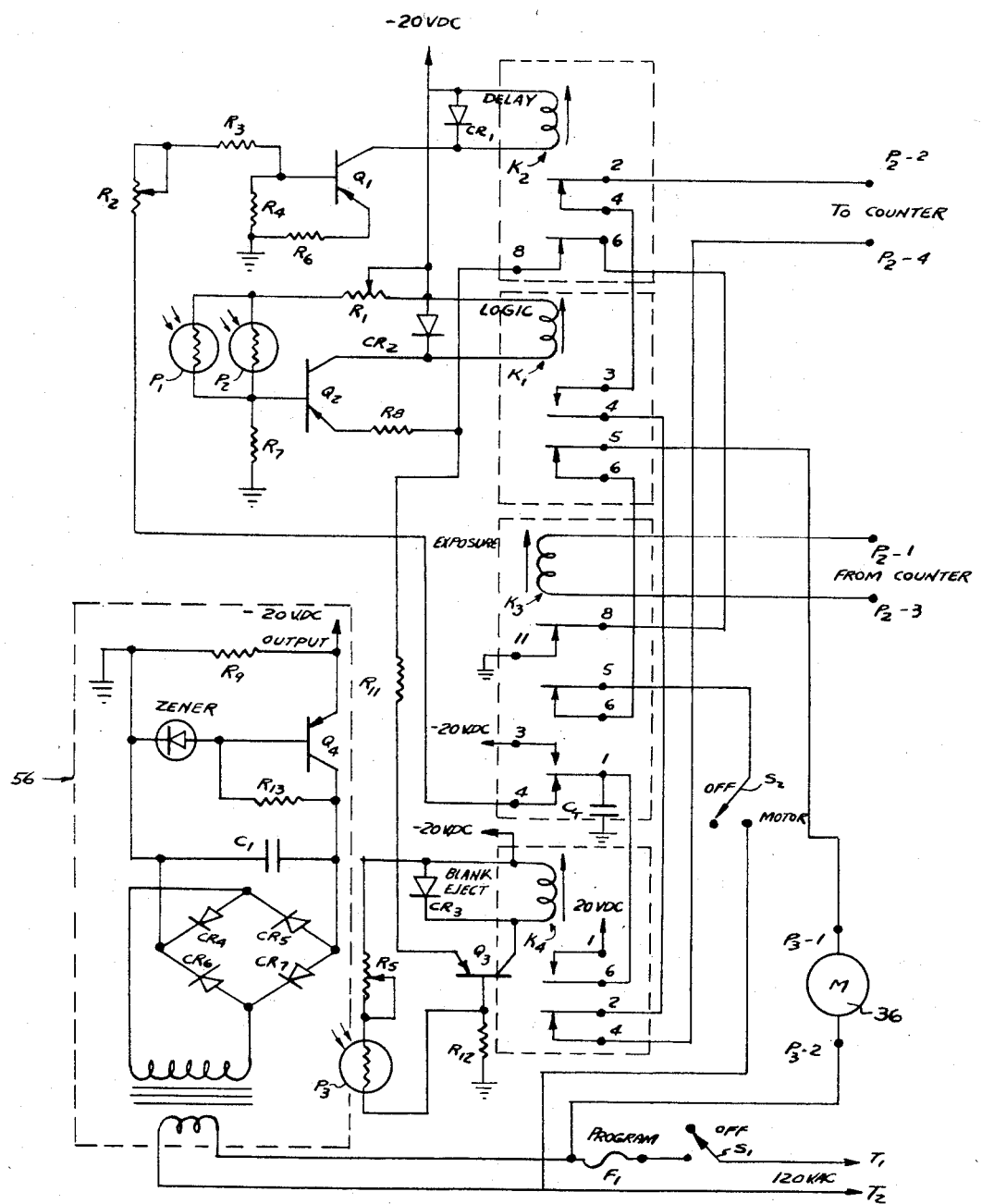

Our invention relates to automatic handling of developed photographic film and more particularly to a device to provide automatic advancing, framing and sensing of roll or strip photographic film.

Although the present device is used and herein described as it is adapted to a photograph printing machine, it will be apparent that it can operate in conjunction with other equipment used in film cutting, viewing, marking and the like, wherever film strip advancing is required for any purpose.

Present methods of printing photographs from developed roll or strip film by commercial photographers may be briefly explained. The developed film is generally fed manually into a frame platen positioned under the printing machine lens and properly oriented, after which the exposure light is turned on for the required time interval. Each frame is, in effect, handled individually. This consumes the full time of an operator, and there is always the possibility he may skip a frame, get it improperly positioned, or print it more than once. Further, since it is a tedious task, one cannot operate for long periods without rest.

The present invention has as its primary object the elimination of manual feeding and framing and human judgment connected with the printing process or other operations performed with respect to successive frames of a developed roll and strip film.

Other objects, advantages and uses of the present invention will be apparent from the following description and the accompanying drawings in which like reference characters refer to like parts throughout the several views and in which:

FIG. 1 is a perspective view of a perferred device embodying the present invention, FIG. 2 is a top plan view of the device of FIG. 1, FIG. 3 is a schematic diagram of the control circuit operating the device, and FIG. 4 is a cross-sectional view taken substantially on the line 4—4 of FIG. 2.

It will be noted in FIGURE 3 that the contact numbering for each relay specifically relates to the contacts of that relay and are not connected with similarly numbered contacts of the other relays, except as such are shown by the interconnections between the relays.

Basically the mechanical structure or "film reader" of the present device preferably comprises a support base 10 having support members 12 at one end adapted to carry a developed spool or roll or strip film 14, support members 16 at the other end having a takeup spool 18. Intermediate the support members 12 and 16 is a platen assembly 20 through which the film is fed. The assembly 20 comprises a lower plate 22 removably secured to the base 10 and an upper plate 24 having registered frame openings 26 and preferably hinged to the lower plate 22 at one side as at 28. The base 10 has a larger opening 30 under the platen assembly 20 so as to accommodate other platens with differently sized openings.

The plates 22 and 24 have registered apertures 32 at the ends of the platen assembly, spaced slightly greater than the length of a frame of the particular roll or strip film to be advanced through the device. Photo conductive cells $P_1$ and $P_2$ are respectively mounted over the apertures 32 on the upper plate 24. A third photo-conductive cell $P_3$ is carried on an arm 34 hinged to the support member 12, and is positioned normally to view the frame openings 26. It may be pivoted out of the way to change the platen assembly 20.

A lamp 35, preferably about 25 watts, is positioned beneath the base 10 to provide light to the photo-conductive cells.

A motor 36 of the magnet brake type is carried on a bracket 38 mounted on the base 10 and has a drive shaft 40 coupled to a shaft 42 carrying a pair of spaced advancing wheels 44 as shown. The shaft 42 is carried between brackets 46. A lower roller 48 is provided in the base 10 to revolvably engage the wheels 44 such that the motor 36 will drive the wheels 44 to advance film between the wheels 44 and roller 48. The drive shaft 40 also carries a pulley 50 to rotate the take-up spool 18 through a slip-type spring belt 52 to a driven pulley 54.

The device described above is preferably adapted to be used with a commercial automatic printer, which would have a projector light source (not shown) of about 1000 watts beneath the base 10 and lenses and printing components (not shown) above. The film will be advanced through the platen assembly 20 and successive frames will be stopped and accurately positioned at the openings 26 for the time interval necessary to accomplish the printing exposure and for visual monitoring if desired.

The preferred control means for advancing and stopping the film roll or strip, for rejecting blank or poorly contrasted frames, and for activating the printer, comprises circuitry and components shown in the diagram of FIG. 3, hereinafter called the "automatic film programmer" or "programmer." This consists of two basic assemblies; namely a film reader, which has been described above, and an electronic programmer.

The film reader is an electro-mechanical device operable to provide film advancing, film framing, and photoconductive cell sensing of the developed roll or strip photographic film.

The electronic programmer is an electronic device consisting of relays, transistors and other electronic components which, together with the film reader, operates and performs a sequence of program events. The equipment operates to perform a given sequence of events as follows: (1) exposure time, (2) eject cycle, (3) logic computation, and (4) blank eject cycle.

1. EXPOSURE TIME

The exposure time may be considered as the end result, an event which occurs after the film is framed in the platen assembly 20 and available for visual observation, photographic printing, or the like.

2. EJECT CYCLE

The eject cycle is an event initiated immediately following each exposure time event. Its purpose is to start the film strip advancing and to prevent multiple exposure time events for a given frame. The eject cycle also prevents undesirable logic time and blank ejection computation during recurrent framing time.

3. LOGIC COMPUTATION

The end of time in the eject cycle marks the beginning of the logic computation event, which solves the framing problem for each negative picture and results in the accurate positioning of each frame in the platen assembly 20 of the film reader. It also prevents the framing of unexposed or poorly contrasted film.

Since this is one of the more difficult operations to understand, some detailed description is necessary.

As noted previously, three photo-conductive cells $P_1$, $P_2$ and $P_3$ are used, operating together with "and gate" logic circuits and a blank ejection circuit. Cells $P_1$ and $P_2$ operate in an "and gate" logic. Cell $P_3$ operates in a blank ejection circuit and works with the logic circuit to provide "not" logic.

A mathematical analysis of the problem will make clear the required computation. The following table of all possible combinations of the photo-conductive cell conditons in relation to circuit logic is given. Two conditions exist for each cell shown in the table as "0" or "1".

| Combination | $P_1$ | $P_2$ | $P_3$ | Result |
|---|---|---|---|---|
| 1 | 0 | 0 | 0 | M |
| 2 | 0 | 0 | 1 | E |
| 3 | 0 | 1 | 0 | M |
| 4 | 0 | 1 | 1 | E |
| 5 | 1 | 0 | 0 | M |
| 6 | 1 | 0 | 1 | E |
| 7 | 1 | 1 | 0 | F |
| 8 | 1 | 1 | 1 | E |

Where; M=Film in motion; E=Blank eject and film remains in motion; F=Film is framed and is no longer in motion.

As can be seen, there is only one possible condition (#7) that results in the solution to the logic problem; namely, where the film is framed and is no longer in motion. When this problem is solved by the equipment an exposure time event is initiated.

An equation for the logic solution of the frame problem could be written as $P_1 P_2 \overline{P_3} = F$; i.e. $P_1$ "and" $P_2$ "not" $P_3 = F$.

4. BLANK EJECT CYCLE

The blank eject cycle works with the logic computation. Its circuitry is enabled at the end of the eject cycle event, and due to a time delay of the logic circuitry components the eject relay assumes priority over the logic relay by several milliseconds in time, in the case of blank film. When a blank film attempts to frame, the blank eject cycle cycles the delay timer and causes an eject cycle event to occur. In most cases, of course, there is no blank film and logic computation will solve the frame problem.

*Circuit analysis*

Referring now to FIG. 3, the circuitry components comprise leads $T_1$ and $T_2$ from a 120 volt A.C. power source, a main (program) switch $S_1$, a motor switch $S_2$, terminals $P_2$–1 and $P_2$–3 leading from the counter of the printing machine (not shown), terminals $P_2$–2 and $P_2$–4 leading to the counter of said printing machine, a delay relay $K_2$ and associated contacts, a logic relay $K_1$ and associated contacts, an exposure relay $K_3$ and associated contacts, a blank eject relay $K_4$ and associated contacts, (relays and their associated contacts being enclosed by dash lines), transistors $Q_1$, $Q_2$, $Q_3$ and $Q_4$, a —20 volt D.C. output power source 56, the previously mentioned photo-conductive cells $P_1$, $P_2$ and $P_3$, the motor 36, and other resistors and capacitors which will be noted hereinafter, except for conventional and obvious elements common to circuit diagrams.

The previously outlined operations occur as follows:

(1) Since the equipment operates in a sequence of related events, it is necessary to start with a given event in which it is assumed (a) The film reader has been loaded with a roll of film and the equipment has been energized and operating.
(b) An exposure time event is about to end,
(c) Relays $K_2$ (delay), $K_1$ (logic) and $K_4$ (eject) are de-energized, and
(d) Relay $K_3$ (exposure) is energized, moving switches from the positions shown so that the capacitor $C_T$ is charged to a —20 volts D.C. through its contacts 1 and 3.

(2) When the external counter of the printer (not shown) has completed its desired time it will deenergize and remove 120 volts A.C. commercial power input from terminals $P_2$–1 and $P_2$–3, causing relay $K_3$ to de-energize. Contacts 11 and 8 of relay $K_3$ will now make and tend to enable conduction of the transistorized circuits of transistors $Q_2$ (logic) and $Q_3$ (blank eject) by completing the transistors emitter-to-ground connection. At the same instant that relay $K_3$ (exposure) is de-energized, the negative voltage charge on capacitor $C_T$ is applied through contacts 1 and 3 of relay $K_3$ (exposure) to the base-through-emitter circuit of transistor $Q_1$ (delay) causing relay $K_2$ (delay) to energize. However, the $K_1$ logic relay circuit is chosen to have a longer reaction time than the time delay circuit. Thus relay $K_2$ (delay) has priority over relay $K_1$ (logic) due to inherent energizing time of the selected relays.

Capacitor $C_T$ will now discharge at an exponential rate through the circuit transistor $Q_1$ (delay), and resistors $R_4$, $R_3$ and $R_2$, which circuit components are so chosen as to provide a variable time delay between two and twelve seconds by adjustment of variable resistor $R_2$. Thus relay $K_2$ (delay) will remain energized for this period of time, which is determined by the length of time required to position a frame (depending on speed of the motor 36, which as presently used will provide a film advance speed of about .5 inch per second) less one second. Thus, for example, if the framing time is eight seconds, the delay time would be adjusted to seven seconds, thereby allowing one second only for the next event, logic computation, to occur.

When relay $K_2$ (delay) is energized, its switch contacts 6 and 8 open to prevent any logic computation and blank eject cycle events to occur. This prevents any erratic contrasts that may be present on the film in the platen 20 from effecting current flow through the transistor $Q_2$ (logic) and $Q_3$ (blank eject) circuits. That is, the delay prevents accidental sensing of film portions which may be unexposed, or very lightly exposed, as are the gaps between frames, prior to the approach of the succeeding gaps. This technique acts to reduce adverse thermal effects which are to be avoided if possible in transistorized circuits.

Switch contacts 2 and 4 of relay $K_2$ (delay) also open at this time to prevent a possibility of an exposure event, i.e. prevents continuity at the output terminals $P_2$–2 and $P_2$–4.

After capacitor $C_T$ has discharged sufficiently to reduce the base current of transistor $Q_1$ (delay), then relay $K_2$ (delay) will de-energize, ending the eject cycle event.

(3) The de-energizing of relay $K_2$ (delay) marks the beginning of the logic computation event. Switch contacts 2 and 4 of relay $K_2$ (delay) make connection to enable external continuity at terminals $P_2$-2 and $P_2$-4. Switch contacts 6 and 8 of relay $K_2$ (delay) make connection to enable conduction of transistors $Q_2$ (logic) and $Q_3$ (blank eject) for the logic computation event by completing their emitters ground paths.

Since the logic time (about one second) is used to compute the problem involving the correct positioning of a frame in the platen 20 to be printed or monitored, it is most important. The developed film strip or roll contains a marginal space of approximately ⅛ inch between exposure frames which is quite translucent, affording a contrast of light intensity with the exposed frames. As such, an excellent means of sensing is by means of the light source 35 and the photo-conductive cells $P_1$, $P_2$ and $P_3$.

In the film reader, the apertures 32 and 26 of the platen assembly 20 are so positioned that when a developed frame is in proper position in the aperture 26, the marginal spaces will register with the apertures 32 and illuminate the light holes of the photo-conductive cells $P_1$ and $P_2$. This light density increase causes an increase in the conduction of the photo-conductive cells $P_1$ and $P_2$, resulting in an increase in the base current of transistor $Q_2$ (logic), energizing the relay $K_1$ (logic).

It is noted that the cells $P_1$ and $P_2$ along with the adjustable resistor $R_1$ are so arranged to form an "and" gate. The "and" gate prevents premature energizing of relay $K_1$ (logic) should the film contain erratic contrast that otherwise would cause current flow to the relay $K_1$ (logic) if only a single cell were used for framing.

When the relay $K_1$ (logic) energizes, its switch contacts 5 and 6 open, removing the 120 volt A.C. from the motor 36, and its magnetic brake is applied. The film frame is now correctly positioned and not in motion. Switch contacts 3 and 4 of relay $K_1$ (logic) make connection, providing electrical continuity through switch contacts 2 and 4 of relay $K_2$ (delay) and switch contacts 2 and 4 of relay $K_4$ (blank eject) respectively to terminals $P_2$-2 and $P_2$-4, initiating an exposure event.

(4) The exposure event starts a counter (not shown) for printing operation. In the conventional printer (not shown) the counter energizes to supply 120 volts AC to the terminals $P_2$-1 and $P_2$-3, causing the time control relay $K_3$ (exposure) to energize and remain energized until the printer counter has completed its cycling to produce the number of prints that the printer timer (not shown) is set for.

When the relay $K_3$ (exposure) is energized, its switch contacts 5 and 6 open as a safety feature to assure that the drive motor 36 is locked with its magnetic brake and completely disabled. Switch contacts 8 and 11 of relay $K_3$ (exposure) open also to disable both the eject and logic relay transistor circuits, preventing relays $K_1$ (logic) and $K_4$ (blank eject) from energizing. This is an essential feature of the programmer function, in that there is a 25 watt lamp for photo-cell sensing, but for printing exposure a 1000 watt light source is used, which would otherwise saturate the photo-conductive cells, energizing relay $K_1$ (logic) to cause a printing re-cycle to occur and exposure time would then be endless.

With the energizing of relay $K_3$ (exposure), its switch contacts 3 and 1 make connection and capacitor $C_T$ charges once again to —20 volts D.C. for use in the eject cycle at the end of the exposure time event when the relay $K_3$ (exposure) de-energizes.

(5) After the exposure time has elapsed, the external counter will de-energize and 120 volts A.C. will be removed from terminals $P_2$-1 and $P_2$-3, de-energizing relay $K_3$ (exposure). Its switch contacts 1 and 4 will make connection as explained in paragraph (2) supra. Another eject cycle will then be initiated and end with an attempt at logic computation. However, if a blank or poorly contrasted film is advanced toward a framing position at this time, a blank eject cycle event will occur.

(6) Assuming that a blank or poorly contrasted film is moving into the platen 20, at logic computation time when the relay $K_2$ (delay) enables both the transistor $Q_2$ (logic) circuit and transistor $Q_3$ (blank eject) circuit, the light on photo-conductive cell $P_3$ will effect sufficient collector current in transistor $Q_3$ (blank eject) to energize relay $K_4$ (blank eject). The sensitivity of this circuit may be adjusted by means of the adjustable resistor $R_5$.

Relay $K_4$ (blank eject) is selected to have a shorter energizing time than relay $K_1$ (logic) and therefore will assume priority, thus preventing exposure time events from occuring whenever blank or poorly contrasted film is moving through the platen 20, regardless of the quantity or spacing of the frames.

When relay $K_4$ (blank eject) energizes, its contacts 2 and 4 open to prevent the initiation of an exposure time event, while its contacts 1 and 6 make connection, instantly charging capacitor $C_T$ to —20 volts D.C. This voltage charge initiates the delay timer and energizes relay $K_2$ (delay). An eject cycle then begins. With relay $K_2$ (delay) energized, transistors $Q_2$ (logic) and $Q_3$ (blank eject) are disabled and relay $K_4$ (blank eject) immediately de-energizes. Relay $K_2$ (delay) will remain energized for seven seconds as before, after which time it will de-energize to initiate the beginning of a logic computation event.

(7) As previously noted, the present device may be used for visual monitoring of film. The automatic operation is the same as previously described. For semiautomatic operation it is only necessary to turn the main (program) switch $S_1$ off and on as desired.

The power supply 56 enclosed by dash lines in FIG. 3 is conventional and little comment is necessary. All active devices are of the transistorized or semi-conductor type. Zener diode reference standard is used to produce a —20 volt D.C. output at 2 amperes, maximum load current. Transistor $Q_4$ operates as a series regulator to maintain the output voltage within aproximately 1% with input variations from 100 to 130 volts A.C.

In summary, the present device includes an electro-mechanical film reader with photo-conductive cell sensing of a developed roll or strip film negative which is advanced, preferably about .5 inch/second by a magnetic brake type motor drive.

The control and actuator for the device and for the printer or other mechanism with which the device is associated is a transistorized logic type electronic programmer with relay switching to produce a desired sequence of programmed events.

Inputs include alternating current single phase commercial 120 volt A.C. power and an external light source for the photo-conductive cells. The programmer output is the electrical circuit continuity to provide automatic starting of external counters.

The programmed events include an exposure time using an external control period, an eject cycle of about two to twelve seconds, a logic computation of one second or less duration, and a blank eject cycle to prevent framing of blank or poorly contrasted film. In operation, the device has full automatic re-cycling as well as disabling of the motor drive and programming during the exposure time.

Although we have described only one embodiment of our invention, it will be apparent to one skilled in the art to which the invention pertains that various changes and modifications may be made therein without departing from the spirit of the invention or the scope of the appended claims.

We claim:

1. An automatic photographic film programmer for developed roll and strip film having successive frames, comprising:
 (a) means advancing said film strip through a pre-selected station,
 (b) means simultaneously sensing gaps between one frame and the two frames adjacent thereto as said frames move successively through said station and actuating said advancing means to stop same for locating successive frames at said station.

2. The programmer as defined in claim 1 and in which said sensing means includes means sensing blank and poorly contrasted frames and moving same past said station without stopping.

3. The programmer as defined in claim 1 and in which said sensing means comprises a pair of light responsive elements spaced a distance greater than the length of a frame and cooperatively operable to actuate said advancing means responsive to gaps between two pairs of frames.

4. The programmer as defined in claim 1 and including means de-energizing said sensing means for a selected time interval following actuation of said advancing means.

5. The programmer as defined in claim 1 and having means actuated to start said advancing means after a pre-selected time interval.

6. The programmer as defined in claim 3 and in which said sensing means includes a third light responsive element intermediate the first said elements and operable on sensing blank and poorly contrasted frames to prevent stopping of said advancing means.

7. An automatic photographic film programmer for developed strip and roll film having successive frames comprising:
 (a) means performing an operation relative to successive frames,
 (b) means advancing said film strip through a pre-selected station, and
 (c) means sensing arrival of successive frames at said station and actuating said operation performing means in response to the sensing of said frames, and means sensing the presence of blank and poorly contrasted film and blocking actuation of said operation performing means when such film arrives at said station.

8. An automatic photographic film programmer for developed strip and roll film having successive frames, comprising:
 (a) a platen assembly having a frame opening and apertures at each end of said opening spaced a greater distance than the length of a film frame,
 (b) a light source on one side of said platen,
 (c) photo-conductive cells sensing light passing through said apertures, and
 (d) a programmer means connected with said cells and operable to perform a selected sequence of events in response to conductivity of said cells.

9. The programmer as defined in claim 8 and having a third photo-conductive cell connected with said programmer means and sensing light passing through said platen frame opening.

10. The programmer as defined in claim 8 and having means advancing said film through said platen and operably connected with said programmer means for starting and stopping said advancing means in response to performance of said sequence of events.

11. An automatic photographic film programmer for developed strip and roll of film having successive frames, comprising:
 (a) means for performing an operation relative to successive frames;
 (b) means for advancing said film strip through a pre-selected station;
 (c) a pair of spaced photo-cells operative to sense the position of an individual frame at the pre-selected station; and
 (d) electrical circuit means operative to be energized upon receipt of a particular signal from both of said photo-cells and operative to energize said means for performing an operation relative to the signal to the frame.

12. The programmer of claim 11 wherein the circuit means consists of connections joining said photo-cells into an "and" gate and a relay connected so as to be energized upon the receipt of an appropriate output signal from the "and" gate.

13. The programmer of claim 11 wherein the photo-cells consist of photo-conductive cells connected in parallel to one another and in series with the coil of the relay, the resistance of the photo-conductive cells being such that said relay is not energized unless both the photo-cells are exposed to light.

References Cited
UNITED STATES PATENTS

| | | | |
|---|---|---|---|
| 3,148,585 | 9/1964 | Armstrong et al. | 95—73 XR |
| 3,209,644 | 10/1965 | Simmon et al. | 95—75 XR |
| 3,288,046 | 11/1966 | Mey | 95—75 |

NORTON ANSHER, *Primary Examiner.*

GARY M. HOFFMAN, *Assistant Examiner.*